United States Patent [19]

Banks

[11] Patent Number: 4,595,032
[45] Date of Patent: Jun. 17, 1986

[54] VALVE CLOSING DEVICE

[75] Inventor: William Banks, Ballarat North, Australia

[73] Assignee: John Valves Pty., Ltd., Ballarat, Australia

[21] Appl. No.: 579,991

[22] Filed: Feb. 14, 1984

[30] Foreign Application Priority Data

Feb. 25, 1983 [AU] Australia ............................... PF8204

[51] Int. Cl.⁴ ........................ F16K 15/03; F16K 31/56
[52] U.S. Cl. ........................................ 137/527; 251/75
[58] Field of Search ...................... 137/418, 527, 527.2, 137/527.4, 527.6; 251/75

[56] References Cited

U.S. PATENT DOCUMENTS

| 1,113,282 | 10/1914 | Anderson | 137/527.4 |
| 1,637,761 | 8/1927 | Butler | 251/75 |
| 1,754,729 | 4/1930 | Traver | 251/75 |
| 1,804,599 | 5/1931 | Edel | 251/75 |
| 2,888,031 | 5/1959 | Malecki | 251/75 |
| 3,176,719 | 4/1965 | Nord et al. | 251/75 |
| 3,972,504 | 8/1976 | DiSabatino, Jr. et al. | 137/527.4 |
| 3,990,674 | 11/1976 | Schattenberg | 251/75 |
| 4,109,819 | 8/1978 | Kushman et al. | 137/527 |

FOREIGN PATENT DOCUMENTS

| 1064436 | 5/1954 | France | 137/527.4 |
| 0024266 | 3/1981 | Japan | 137/527.6 |
| 0006336 | of 1909 | United Kingdom | 137/527 |

Primary Examiner—Alan Cohan
Assistant Examiner—John A. Rivell
Attorney, Agent, or Firm—Robert H. Ware; Melvin I. Stoltz; Alfred A. Fressola

[57] ABSTRACT

A valve closure is disclosed which comprises a bifurcated arm 14 pivotally coupled to a sleeve 34 by a connector 28 and a pivot pin 26. The sleeve 34 receives a rod 44 coupled to a base plate 46 for receiving a spring 42. The sleeve 34 also has a support plate 38 coupled thereto which receives the spring 42. When the valve element is in an open position the arm 14, sleeve 34 and rod 44 are a generally straight line so that the spring does not exert any torque on the valve element. However, when the valve element commences to close the arm 14 is moved relative to the sleeve 34 and the rod 44 so that the spring 42 causes torque to be exerted through the arm to assist closure of the valve element. In a second embodiment a tension spring 104 is provided which acts on lever 106 pivotally connected to a closure arm 108.

18 Claims, 6 Drawing Figures

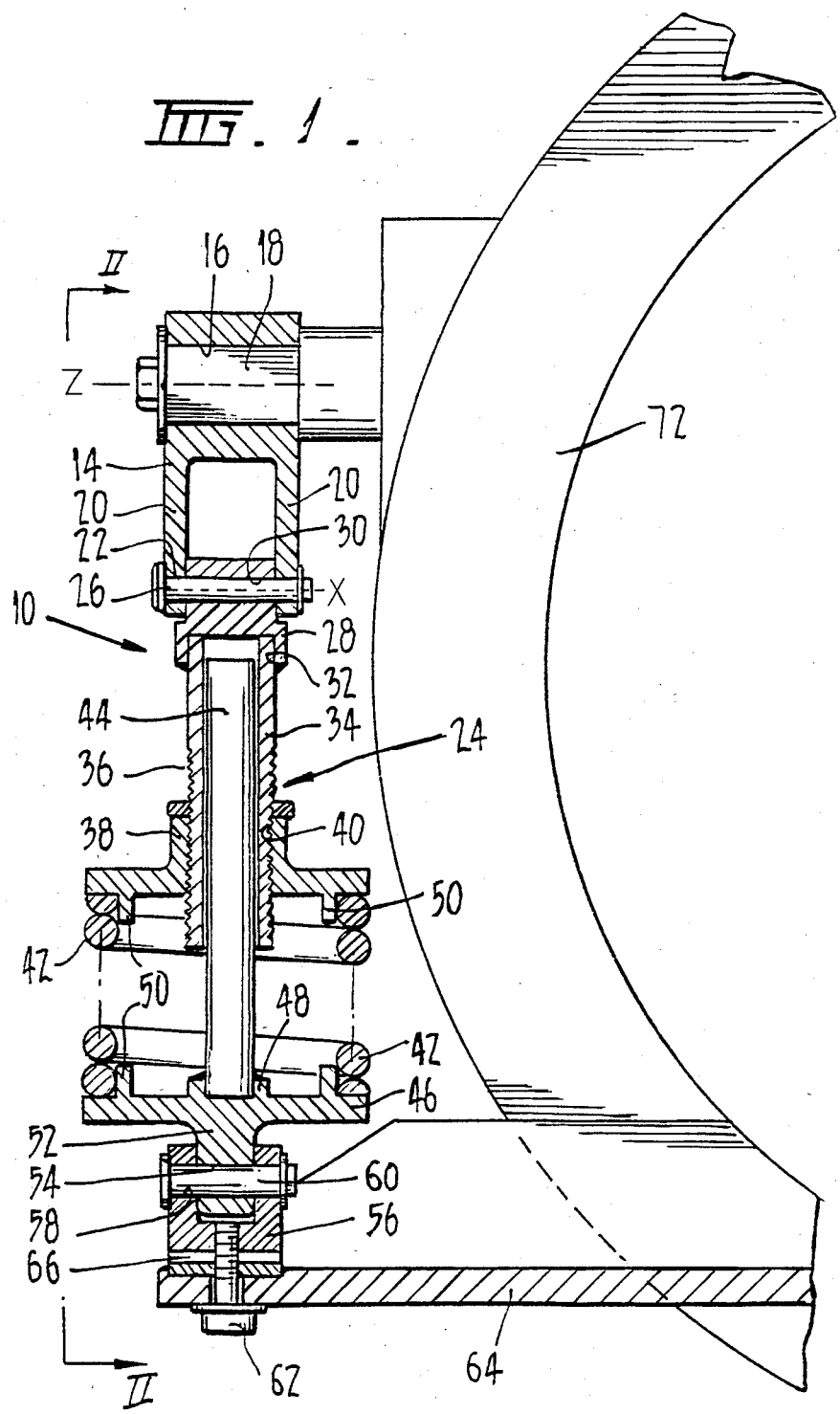

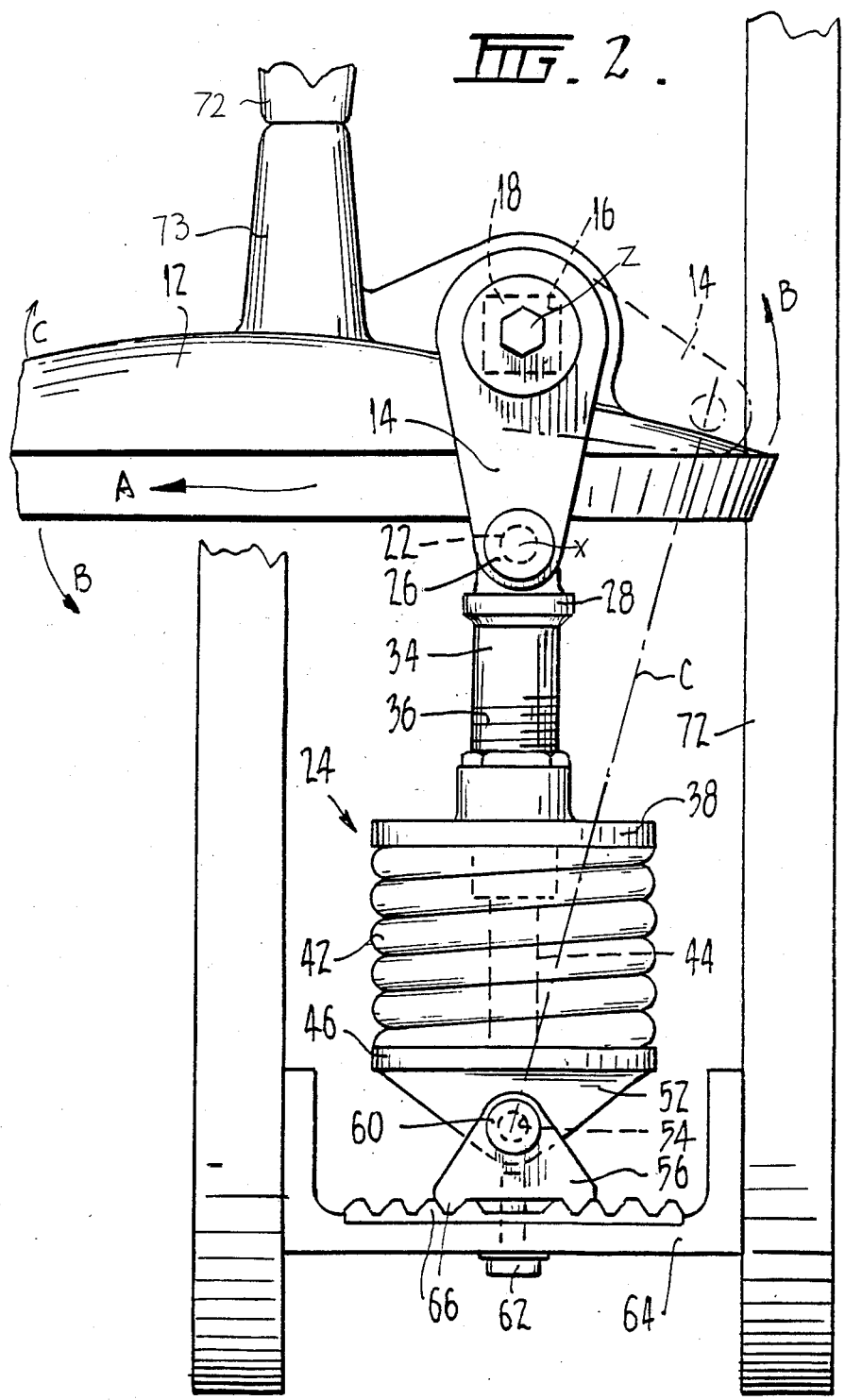

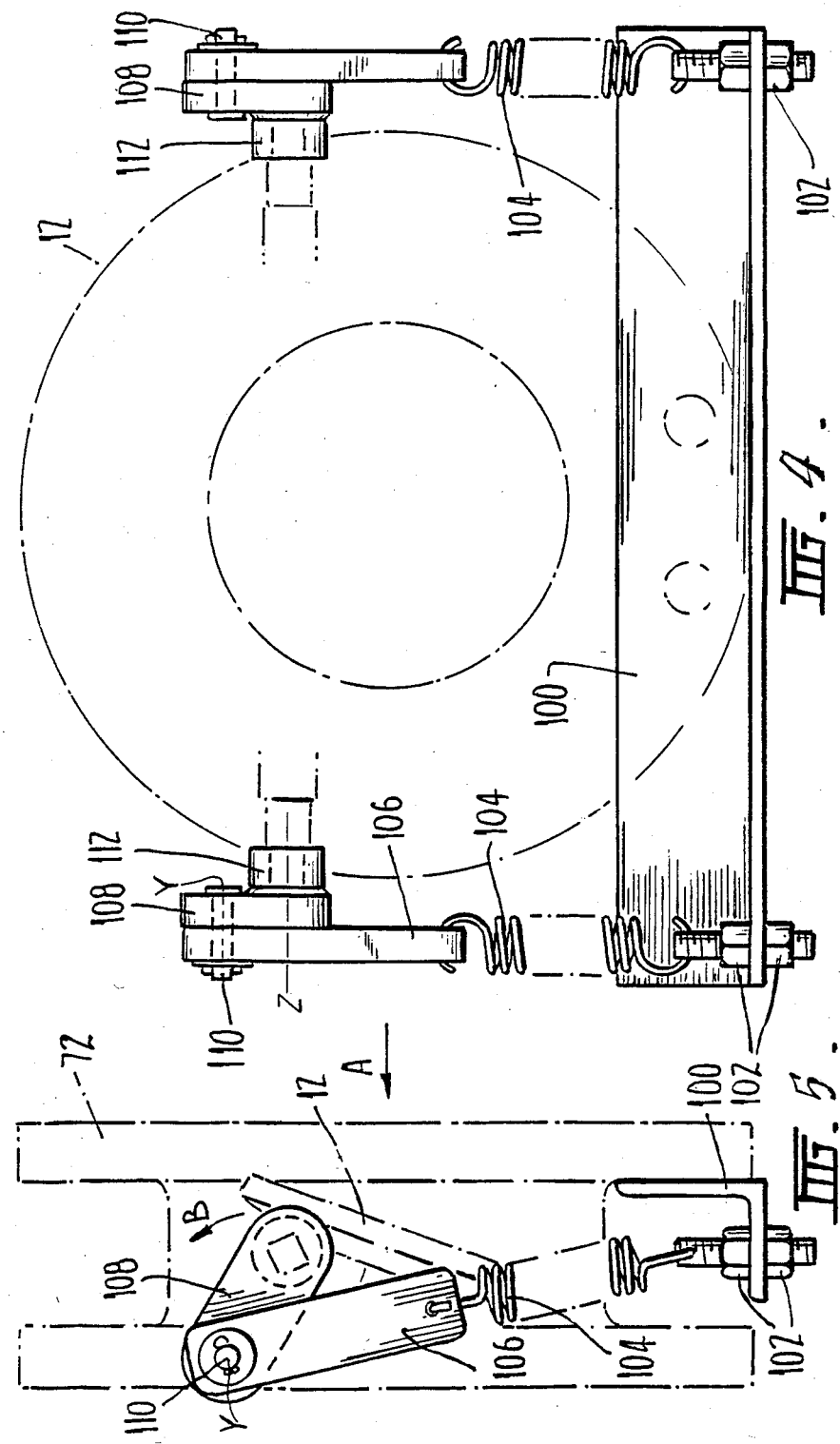

VALVE CLOSING DEVICE

This invention relates to a device for assisting closure of a valve element and in particular to a device for assisting closure of a disc of a tilting disc valve or swing check type.

Tilting disc valves include a disc for regulating flow of a liquid through the valve and may have an external mechanism to assist the disc to close. Usually tilting disc valves are used in a conduit in conjunction with a pump or the like which is upstream of the valve. The purpose of the valve is to close the conduit if the pump fails or for other reasons liquid pressure in the conduit drops to prevent backflow through the valve and into the pump.

The mechanism which may be utilised to assist the valve disc to close is usually in the form of a lever and weight which is connected to the disc. When the valve is open the disc is generally horizontal and parallel to the direction of liquid flow through the valve. The flow of fluid past the disc produces a torque which is required to maintain the disc in the open position and counteract the torque generated by any external weight. When the moment of the disc, weight and lever is greater that the torque produced by the fluid flow through the valve, the disc closes by pivoting about a shaft. Accordingly once the flow rate through the valve drops due to failure of the pump or the like, the weight of the disc and the lever and weight causes the disc to rotate into a closed position.

However in the above tilting disc valves the time taken for the disc to close the valve against the reduced pressure of the liquid in the valve is not always quick enough to prevent some backflow through the valve. If backflow does pass through the valve it can damage the pump and also damage the valve itself by slamming the disc against the valve body.

Further, because the flow of fluid through the valve is required to maintain the disc in the open position and the lever and weight in the upper position dynamic fluid forces always act on the disc which results in a pressure loss through the valve.

The object of this invention is to overcome the above drawbacks.

The present invention may therefore be said to reside in a device for assisting closure of a valve element, said device comprising a closure member coupled to said valve element, and biasing means coupled for relative movement to the closure member, such that when the valve element is in an open position the closure member and biasing means are in a generally straight line and when the valve element commences to close the closure member is moved relative to the biasing means so torque is exerted by the biasing means through the closure member to assist closure of the valve.

Accordingly since closure of the valve element is assisted by torque imparted to the disc by the biasing means the element closes quickly to prevent backflow through the valve and since the closure member and biasing means are in a straight line when the element is open the force of the biasing means does not cause any torque to be imparted to the element and the flow through the valve need only maintain the element itself in the open position. Hence pressure loss through the valve when in the open position is greatly reduced.

Preferably the element is a disc and the closure member is an arm coupled to the disc by a shaft by means of a square section, pin or key so that it cannot turn relative to the arm.

Preferably the biasing means includes a coil spring retained between a pair of plates which are pivotally coupled to the arm and a base plate.

A preferred embodiment of the invention will be described with reference to the accompanying drawings in which:

FIG. 1 is a cross-sectional view of a device embodying the invention with a disc of a valve schematically shown in a closed position;

FIG. 2 is a view along the line II—II of FIG. 1 with a disc shown in the open position;

FIG. 4 is a front view of a second embodiment; and

FIG. 5 is a side view of the embodiment of FIG. 4.

Figure 3A:
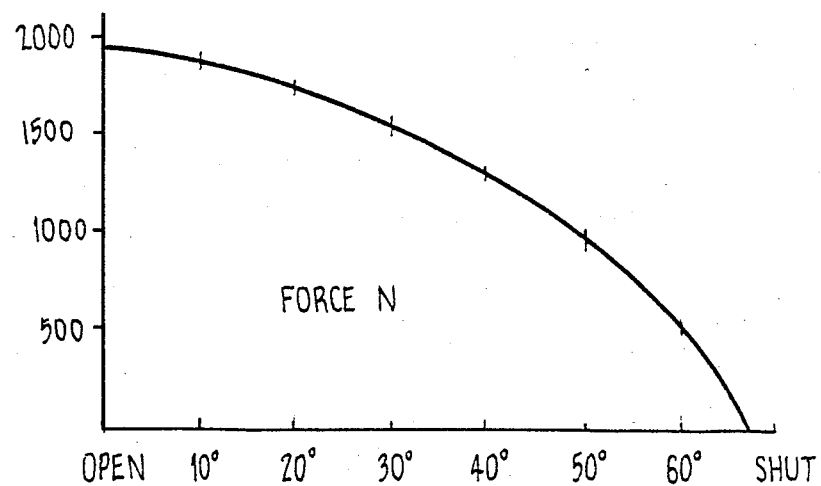
FIGS. 3a and 3b are graphs showing the relation between the force and position of the disc and the torque imparted to the disc and the position of the disc respectively.

Referring to FIG. 1 the device 10 for assisting closure of a valve disc 12 comprises an arm 14 which has a square hole 16. Fixed in the hole 16 is a shaft 18 which extends through the valve body 72 and is connected to the valve disc 12 which regulates flow through the valve (not shown). Axis Z in FIG. 2 denotes the rotational axis of valve disc 12 as it rotates between fully opened position and a closed position. The arm 14 has a bifurcated portion 20 which is provided with a hole 22 to enable the arm to be pivotally connected to a biasing means 24 by a pin 26 which has a center axis X.

The biasing means 24 comprises a connector 28 which has a hole 30 for receiving the pin 26. The connector 28 has a circular recess 32 which receives and retains a sleeve 34 which is provided with a screw thread 36 (see FIG. 2). An annular top plate 38 having an opening 40 provided with a screw thread is screwed onto the sleeve 34. A coil spring 42 and a rod 44 are located between the top plate 38 and an annular bottom plate 46 with the rod 44 extending up into sleeve 34. The lower end of the rod 44 is secured in a circular recess 48 on plate 46. The plate 38 and 46 are provided with projections 50 for retaining the spring 42 between the plates. The top plate 38 is screwed onto the sleeve 34 a sufficient distance to ensure that the coil spring 42 is compressed when the biasing means 24 and arm 14 are in a straight line as shown in FIGS. 1 and 2.

The bottom plate 46 is provided with a stem 52 which has a hole 54. The stem 52 is received in a bifurcated bracket 56 which has a hole 58 to enable the plate 46 to be pivotally connected to the bracket by a pin 60. The bracket 56 is securely connected to a base plate 64 by, for example, a bolt 62 and the base plate is coupled to the valve body. The plate 64 and bracket 56 may be provided with intermeshing teeth 67 (FIG. 2) to securely retain the bracket 56 on the plate and to allow adjustment.

The operation of the device 10 will be described with reference to FIG. 2. FIG. 2 shows a valve disc 12 in the open position with the flow through the valve being the direction of arrow A. As shown in FIG. 2, when the valve is fully open the biasing means 24, center axis X of pivot pin 26 and arm 14 are in a straight line so that no torque (as shown by the graph in FIG. 3b) is imparted to the disc 12. When disc 12 is fully open, upstanding member 73 of disc 12 contacts a portion of valve body 72 so as to prevent further rotation of disc 12 in the direction of arrow C. If the velocity of the liquid flow through the valve drops below that required to maintain the disc in the open position the disc 12 will rotate in the direction of arrow B about shaft 18. This will cause the arm 14 to move with shaft 18 into the position shown in dotted lines in FIG. 2. the biasing means 24 will be drawn by the arm 14 into the position represented by line C in view of the pivotal connection between the arm 14 connector 28 and the plate 46.

Once the arm starts to move into the position shown in dotted lines the arm, center axis X and biasing means are no longer in a straight line and the force of the spring 42 commences to act to push the arm 14, shaft 18 and disc 12 in the direction of movement of the disc 12. Accordingly torque is imparted by the biasing means 24 to the arm 14, shaft 18 and then to the disc 12 to force the disc 12 to close. As the spring 42 extends, plate 38 and stem 34 move upwardly with respect to the rod 44 until the spring is fully extended. Preferably the spring should reach its fully extended position when the valve disc 12 has reached its closed position.

Figure 3B:
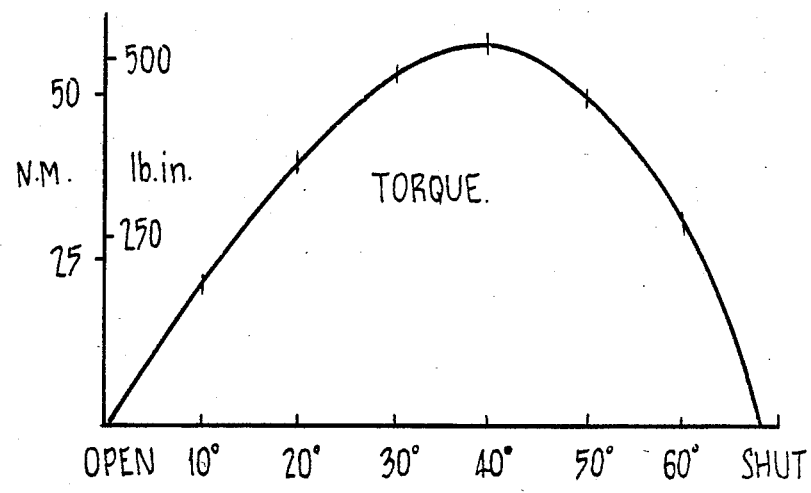

As shown in FIGS. 3a and 3b a large force acts on the arm when the valve disc 12 is in the open position but in view of the geometry of the arm, biasing means and disc 12 when in the open position there is no torque acting on the disc 12. As soon as the disc 12 starts to move it is imparted to the disc via the arm 14 and shaft 18 to assist in closure of the disc 12. The force imparted by the spring 42 is of course greatest when the spring is compressed and reduces as the spring expands. However the torque imparted to the disc 12 increases as the disc closes and reaches a peak when the disc is about half closed. However at all times during closure of the disc spring 42 causes torque to be imparted to the disc 12 to cause the disc 12 to close quickly and prevent backflow through the valve.

When the valve is again opened it of course must be opened against the bias of the spring 42. However once the valve is fully opened, as noted above, no torque is imparted to the disc 12.

With reference to FIGS. 4 and 5 which show a second embodiment which utilizes two closing devices, one on each side of the disc 12. The closing devices are supported on a bracket 100 and comprise a bolt and nut assembly 102 firmly fixed to the bracket which has a hole for receiving one end of a tension spring 104. The other end of the tension spring 104 is connected to a lever 106. The lever 106 is connected to a closure arm 108 by means of a pivot pin 110 having a center axis Y. As seen in FIG. 4 the closure arm 108 is arranged inwardly with respect to the disc valve 12 of the lever 106. The closure arm 108 is connected to a shaft 112 which is coupled to the disc valve 12.

When the disc valve 12 is in the open position the spring 104, lever 106, center axis Y and closure arm 108 form a straight line so that no torque is imparted to the disc 12 by means of the tension spring 104. As the disc 12 commences to move into the closed position (which is shown in FIGS. 4 and 5) the closure arm 108 moves relative to the lever 106 and spring 104. Once the arms move out of the straight line configuration with the center axis Y the tension spring 104 biases the lever 106 to draw the lever downwardly in FIG. 5 so that the lever arm causes the disc 12 to rotate in a direction of arrow B into the closed position. It will of course be noted that the lever arm 108 is coupled to the valve disc 12 by the shaft 112 in a similar manner to that described with reference to FIGS. 1 and 2 so that the shaft 112 cannot rotate relative to the closure arm 108.

Accordingly the present invention provides a device for assisting closure of a valve which enables the valve to close quickly thereby preventing backflow through the valve and damage to the valve and any pump upstream of the valve and also reduces the pressure drop of the fluid through the valve as the disc is in the open position because no torque is imparted to the disc when the disc is in the open position.

I claim:

1. A device for assisting closure of a valve element, said device comprising a closure member coupled to said valve element so as to rotate the valve element about an axis between a normally open position and a closed position, and biasing means coupled for relative movement to the closure member by a connecting pin, such that when the valve element is in an open position the closure member and biasing means are in a single generally straight line with the center axis of the connecting pin and the valve rotation axis, the closure member and the biasing means applying no torque to the valve element to move the valve when the valve element is in its usual open operational position and when the valve element commences to close, the closure member is moved relative to the biasing means so that the biasing means and closure member are no longer in a single straight line with the center axis of the connecting pin and the valve rotation axis and so that torque is continuously exerted by the biasing means through the closure member to assist closure of the valve.

2. The device of claim 1 wherein the biasing means comprises a biasing element disposed between a pair of support means, one of said support means being coupled to a sleeve, said sleeve receiving a rod which is coupled to the other of the support means such that said one of said support means and the sleeve are movable relative to the rod under the influence of the biasing element.

3. The device of claim 2 wherein said pair of support means comprise a pair of plates.

4. A device according to claim 1, 2 or 3 wherein said closure member is coupled to the valve element by a shaft, the shaft having a portion which is received in the closure member for fixing the shaft relative to the closure member.

5. The device according to claim 1 wherein said closure member is a bifurcated member which receives the biasing means and the closure member and the biasing means as pivotally coupled together.

6. A device for assisting closure of a valve element, said device comprising a valve closure member coupled to the valve element so as to rotate the valve element about an axis between a normally open position and a closed position, biasing means coupled for relative movement to the closure member by a connecting pin, said biasing means comprising a biasing element supported between a pair of support members, one of the support members being coupled to a sleeve which receives a rod which is coupled to the other of the support members, the closure member and biasing means being in a single generally straight line with the center axis of the connecting pin and the valve rotation axis when the valve element is in an open position so that the closure member and biasing means apply no torque to the valve element to close the valve element, and when the valve element commences to close, the closure member is moved relative to the biasing means so the biasing means and closure member are no longer in a single straight line with the center axis of the connecting pin and the valve rotation axis and so that torque is continuously exerted by the biasing means through the closure member to assist closure of the valve.

7. A device according to claim 1 or 6 wherein the closure member comprises a bifurcated arm which is pivotally coupled to the biasing means.

8. A device according to claim 7 wherein the support members comprise plates and the plate to which the rod is connected is pivotally connected to a base member.

9. A device according to claim 8 wherein said biasing element comprises a coil spring which surrounds said rod and said sleeve.

10. A device according to claim 1 wherein the closure member comprises a closure arm coupled to the valve member and a lever pivotally coupled to the closure arm, said biasing means comprising a tension spring arranged between the lever arm and a base member.

11. A device according to claim 10 wherein said closure member is arranged inwardly of the lever arm and is pivotally coupled to the lever arm by a pivot pin.

12. A device according to claim 1, 10 or 11 coupled on opposed sides of the valve member.

13. A device according to claim 11 where the base member is a L-shaped bracket.

14. A device according to claim 6 wherein the support members comprise plates and the plate to which the rod is connected is pivotally connected to a base member.

15. The device according to claim 6 wherein said biasing element comprises a coil spring which surrounds said rod and said sleeve.

16. A device according to claim 7 wherein said biasing element comprises a coil spring which surrounds said rod and said sleeve.

17. A device as defined in claim 1 further comprising means for preventing the valve element from opening beyond a predetermined position.

18. A device as defined in claim 6 further comprising means for preventing the valve element from opening beyond a predetermined position.

* * * * *